March 1, 1955
O. H. CARSTENS
2,703,214
MOUNTING FOR GLARE SHIELDS OR THE LIKE
Filed Feb. 28, 1950
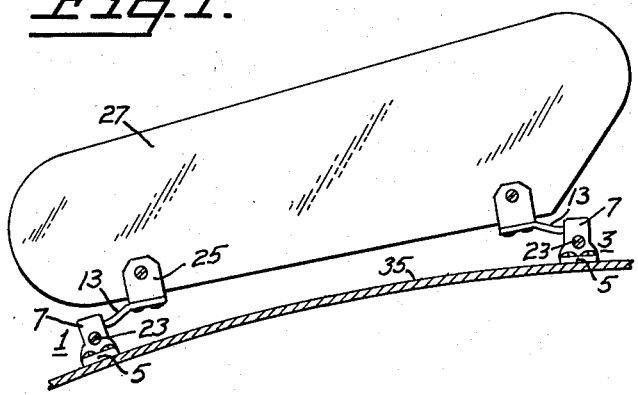
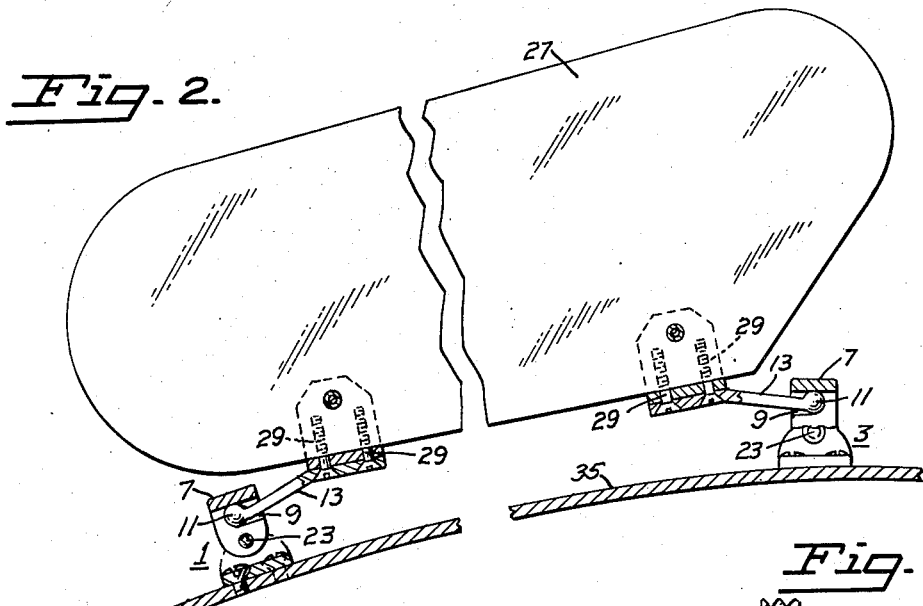
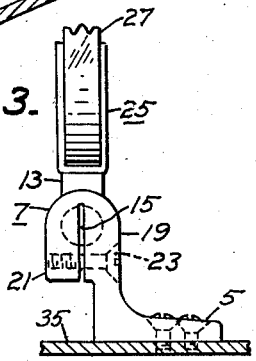
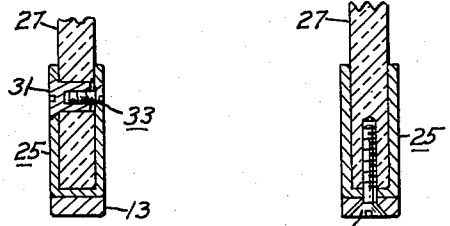
INVENTOR.
OTTO H. CARSTENS
BY
Bruce + Brosler
HIS ATTORNEYS.

United States Patent Office 2,703,214
Patented Mar. 1, 1955

2,703,214

MOUNTING FOR GLARE SHIELDS OR THE LIKE

Otto H. Carstens, Berkeley, Calif.

Application February 28, 1950, Serial No. 146,731

2 Claims. (Cl. 248—201)

My invention relates to glare shields for vehicles, and more particularly to mounting means therefor.

Glare shields, as such, have previously been provided for positioning in front of the driver of a vehicle to subdue sun reflections from the hood or cowling of a car or other vehicle being driven. The present invention is primarily concerned with a mounting for such shield and among the objects of the invention are:

(1) To provide a novel and improved mounting means for a glare shield;

(2) To provide a novel and improved glare shield mounting which shall be sufficiently rugged to inhibit vibration of the shield;

(3) To provide a novel and improved glare shield mounting which shall facilitate the mounting of such shield on an arcuate surface;

(4) To provide a novel and improved glare shield mounting which shall not only facilitate the mounting of such shield on an arcuate surface, but at the same time shall permit of hingedly supporting such shield.

Additional objects of my invention will be brought out in the following description of the same, taken in conjunction with the accompanying drawings wherein—

Figure 1 is a front elevational view of a glare shield installation embodying the present invention;

Figure 2 is an enlarged fragmentary view of Figure 1, depicting the details of construction of the mounting for the glare shield;

Figure 3 is a side elevational view of a mounting bracket of which there are two in each installation;

Figures 4 and 5 are details depicting the manner of attaching the shield to the brackets.

Referring to the drawings for a complete description of the invention in its preferred form, the mounting involves a pair of brackets 1 and 3 which may be similar to each other in all respects, except one is a left-hand bracket while the other is a right-hand one.

Each bracket involves a base 5 terminating in an offset head 7 which is drilled substantially horizontally from one side to provide a cylindrical recess 9 for the reception of the ball end 11 of a shield-supporting arm 13. That portion of the arm in the vicinity of the ball end thereof, being of smaller diameter than the recess in which the end of the arm is inserted, substantial leeway exists for angular swing of the arm in such recess.

Means is provided for clamping such arm against such movement accidentally after the arm has once been adjusted to a desired angular position. Such clamping means is realized by a cut 15 in a vertical plane through the head from its bottom to the upper extent of the recess, to provide two half sections 19 and 21 adapted to be pulled toward each other by a tightening screw 23 passing loosely through the section 19 at a point below the recess 9 and threadedly engaging the opposite section 21.

The free end of the arm is designed to mount a yoke 25 of U-shape adapted to snugly straddle the lower edge of a glare shield 27 of tinted glass or plastic, preferably the latter because of its workability. In preparing the shield for mounting, a pair of holes corresponding in spacing to a pair of aligned mounting holes in the arm and the bottom of the yoke, are drilled into the lower edge of the shield adjacent each end and threaded for the reception of mounting screws 29.

The yoke is further provided with mounting holes through each side in alignment, one of such holes being preferably of larger diameter to accommodate the female half 31 of a finishing screw 33. The shield at this point is drilled for passage of such screw whereby the shield may be clamped tightly between the sides of the yoke, and such clamping action in conjunction with the binding action of the aforementioned mounting screws 29 in the edge of such shield, constitutes a very effective anchoring means for the shield.

In assembling the shield and mounting means, the shield is preferably first affixed to the bracket arms which are then inserted into the head recesses. This determines the spacing of the brackets which may then be screwed or otherwise anchored to the garnish frame of the windshield or upon the upper surface of an instrument panel as circumstances may dictate to be the better practice.

The mounting of the present invention is not limited in its application to surfaces lying in a common plane, but due to the permissible angular adjustability of the bracket arms, the shield may be installed on an arcuate surface 35 having substantial curvature, without in any way affecting the anchoring of the shield to the bracket arms. Thus the mounting is very flexible in its application, besides being very rugged and pleasing in appearance.

The arms, though they may be effectively clamped against free angular movement, may nevertheless be forcibly rotated by the application of suitable force to the shield, whereby the shield may be adjusted from a position of use in front of the driver to an out of the way position below the lower edge of the windshield.

While I have disclosed my invention in its preferred form and in considerable detail, the same is subject to some alteration and modification without departing from the underlying principles involved, and I accordingly do not desire to be limited in my protection to such details as I have illustrated and described, except as may be necessitated by the appended claims.

I claim:

1. Mounting means for a glare shield or the like, comprising a pair of brackets, each including a base terminating in an offset head having a horizontal cylindrical recess in a side thereof, a shield-supporting arm having a ball end for insertion in said cylindrical recess, said arm being of smaller diameter than said recess to permit universal angular movement of said arm in said recess, means for clamping said arm against movement in said recess, and means at the free end of said arm for attachment thereto of a glare shield or the like, said means including a yoke of U-shape for straddling an edge of such shield and having an opening in the bottom thereof in matching alignment with an opening in said arm for the reception of a screw, and aligned openings through the sides thereof for reception of screw means to pass through such shield.

2. Mounting means for a glare shield or the like, comprising a pair of brackets, each including a base terminating in an offset head having a substantially horizontal cylindrical recess in a side thereof and a cut in a vertical plane through said head from the bottom thereof to the upper extent of said recess and dividing said head into two sections, a shield-supporting arm having a ball end for insertion in said cylindrical recess, said arm being of smaller diameter than said recess to permit universal angular movement of said arm in said recess, means for clamping said arm against movement in said recess, said means including a screw passing freely through one of said sections and threadedly engaging the other section, and means at the free end of said arm for attachment thereto of a glare shield or the like, said means including a yoke of U-shape for straddling an edge of such shield and having an opening in the bottom thereof in matching alignment with an opening in said arm for the reception of a screw, and aligned openings through the sides thereof for reception of screw means to pass through such shield.

References Cited in the file of this patent

UNITED STATES PATENTS

| Number | Name | Date |
| --- | --- | --- |
| 773,973 | Palmenberg | Nov. 1, 1904 |
| 1,852,723 | Orton et al. | Apr. 5, 1932 |
| 2,112,726 | Kemp et al. | Mar. 29, 1938 |
| 2,187,027 | Harvey | Jan. 16, 1940 |
| 2,197,810 | Morrison | Apr. 23, 1940 |
| 2,204,691 | Olsen | June 18, 1940 |
| 2,220,429 | Soderberg | Nov. 5, 1940 |
| 2,456,484 | Bell | Dec. 14, 1948 |

FOREIGN PATENTS

| 568,001 | Great Britain | Mar. 13, 1945 |